(12) United States Patent
Sakamura et al.

(10) Patent No.: US 7,416,114 B2
(45) Date of Patent: Aug. 26, 2008

(54) ELECTRONIC VALUE TRANSFER DEVICE EQUIPPED WITH NON-CONTACT IC INTERFACE

(75) Inventors: Ken Sakamura, 9-2, Osaki 4-chome, Shinagawa-ku, Tokyo (JP) 141-0032; Noboru Koshizuka, 27-20, Nishikubo 2-chome, Musashino-shi, Tokyo (JP) 180-0013; Kensaku Mori, Tokyo (JP); Kazuhiko Ishii, Tokyo (JP); Hiroshi Aono, Tokyo (JP); Sadayuki Hongo, Tokyo (JP)

(73) Assignees: Ken Sakamura, Tokyo (JP); Noboru Koshizuka, Musashino-shi (JP); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/516,312

(22) PCT Filed: Jun. 9, 2003

(86) PCT No.: PCT/JP03/07276

§ 371 (c)(1),
(2), (4) Date: Dec. 12, 2005

(87) PCT Pub. No.: WO03/105040

PCT Pub. Date: Dec. 18, 2003

(65) Prior Publication Data

US 2006/0097037 A1    May 11, 2006

(30) Foreign Application Priority Data

Jun. 10, 2002  (JP) .............................. 2002-169336
Jun. 10, 2002  (JP) .............................. 2002-169338

(51) Int. Cl.
*G06K 5/00* (2006.01)
(52) U.S. Cl. ...................................... 235/380; 235/375

(58) Field of Classification Search ................. 235/375, 235/380; 713/182; 455/558
See application file for complete search history.

(56) References Cited

U.S. PATENT DOCUMENTS 6,223,026 B1 *  4/2001  Martschitsch ............... 455/407

(Continued)

FOREIGN PATENT DOCUMENTS

EP    0 949 593 A2    10/1999

(Continued)

OTHER PUBLICATIONS

"Edy Tosai de Keitai Denwa wa Saifu ni Kawaru", Mobile Internet, vol. 2, No. 16, pp. 50-51, Kabushiki Kaisha Ric Telecom 2002.

*Primary Examiner*—Daniel A Hess
(74) *Attorney, Agent, or Firm*—Oblon, Spivak, McClelland, Maier & Neustadt, P.C.

(57) ABSTRACT

An electronic value transferring device such as a high speed and large capacity computer or mobile terminal device is disclosed that can function as a contactless IC card performing electronic value operations. The device is connectable to an IC card that performs electronic value operations, and includes a microprocessor for transmitting and receiving data to and from the IC card: an interface circuit for providing an IC card interface to allow the IC card to send and receive electronic values to and from other IC cards by radio; an antenna; and the microprocessor having a memory for temporarily storing plural electronic values.

8 Claims, 4 Drawing Sheets

U.S. PATENT DOCUMENTS 7,085,931 B1 * 8/2006 Smith et al. .................. 713/182

FOREIGN PATENT DOCUMENTS

| EP | 1 221 669 A1 | 7/2002 |
| JP | 2000-29966 | 1/2000 |
| JP | 2000-113148 | 4/2000 |
| JP | 2000-172814 | 6/2000 |
| JP | 2001-291039 | 10/2001 |
| JP | 2002-109427 | 4/2002 |
| JP | 2002-150236 | 5/2002 |
| KR | 20-0249783 | 11/2001 |
| WO | WO 90/03016 | 3/1990 |
| WO | WO 99/53449 | 10/1999 |
| WO | WO 01/65499 A2 | 9/2001 |
| WO | WO 01/93139 A1 | 12/2001 |

* cited by examiner

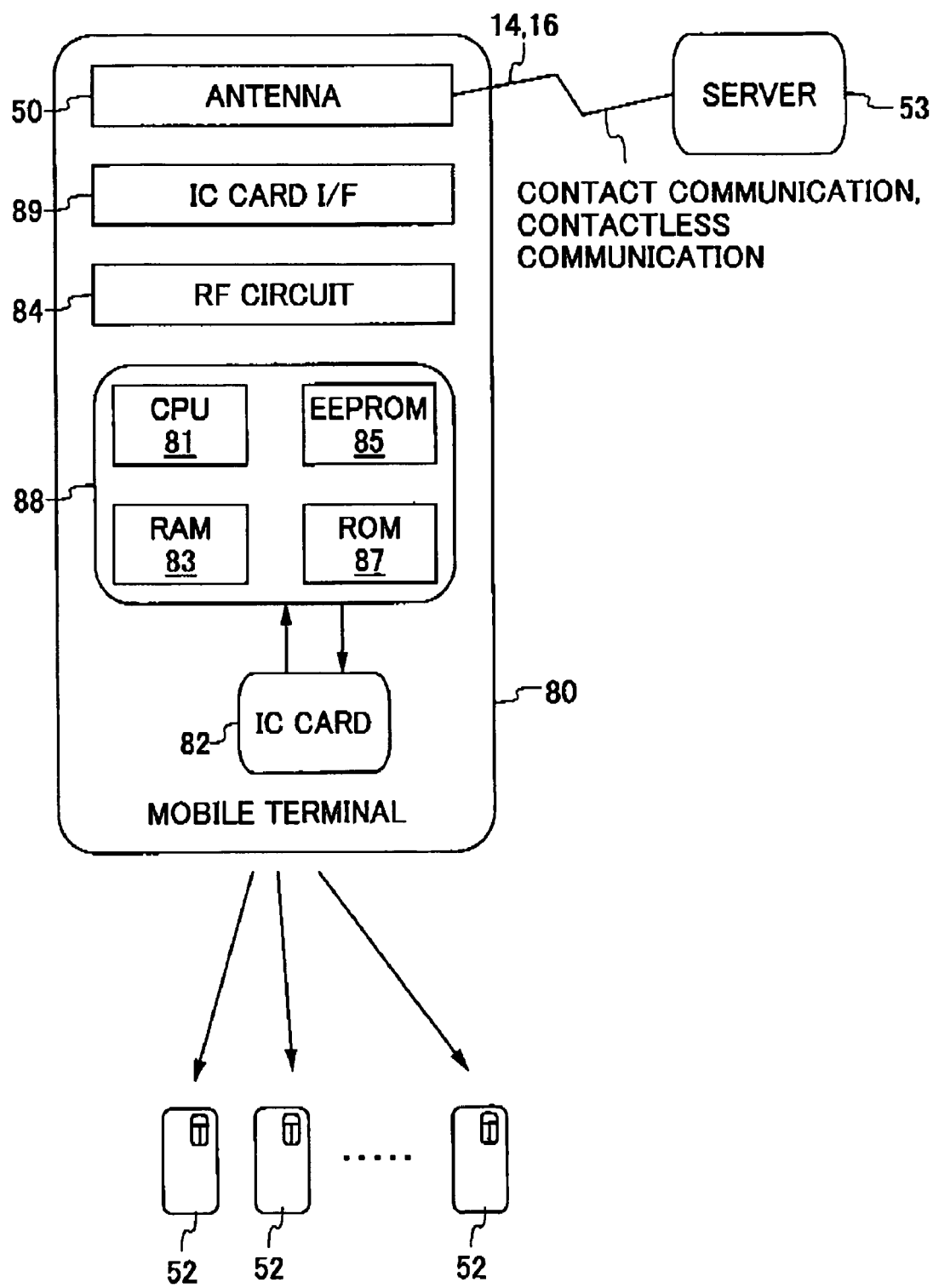

ELECTRONIC VALUE TRANSFER DEVICE EQUIPPED WITH NON-CONTACT IC INTERFACE

TECHNICAL FIELD

The present invention generally relates to an electronic value transferring device such as a computer or a mobile terminal device, which has a contactless IC card interface, and particularly relates to electronic value transferring devices functioning as virtual IC cards having a large capacity memory.

BACKGROUND ART

Valuable physical papers such as concert tickets, train tickets, air tickets and so on are very convenient transaction media, which are physically exchanged for transactions. However, these valuable papers are easily copied and forged, and therefore a new alternative electronic transaction media is desired.

FIG. 1 generally shows a distribution platform in which contactless IC cards are used for distributing electronic values. Electronic values are stored in memories in IC cards, and when a user receives an electronic value from a server or exchanges it with another user, IC cards perform authentication directly with each other and directly exchange an electronic value without going via a server or a terminal memory.

A generating server 11 generates electronic values by request and stores them in an IC card 10 provided in the generating server 11. The generated and stored electronic values are transmitted to an issuing server 13 by request. The issuing server 13 has an IC card 12 connected thereto, which has dual contact and contactless interfaces for storing electronic values. The electronic values transmitted from the generating server 11 are forwarded to the IC card 12 connected to the issuing server 13, and stored in an EEPROM in the IC card 12.

A user uses a mobile phone 43 to send information of a ticket he wants to buy, to a sales server 15, where settlement processing is done. The requested issuing server 13 issues an electronic value to the user's mobile phone 43. When issuing the electronic value, the IC card 12 performs direst authentication with an IC card 42 in the mobile phone 43, and the issues the electronic value.

Alternatively, the user can bring an IC card 52 to the sales server 13, and pay a charge to have an electronic value issued and transferred to the IC card 52. That is, the IC card 12 in the sales server 13 can contactless-communicate directly with the IC card 52 and transfer electronic values.

How to transfer an electronic value is as follows. The IC card 12 in the issuing server 13, and the IC card 42 in the user's mobile phone 43 or the IC card 52 establish radio communication, perform authentication directly with each other, and after authentication the IC card 12 sends the electronic value directly to the IC card 42, 52. After the electronic value is transferred to the IC card 42, 52, the user can use the electronic value in situ. For example, the user can pass through an entrance to a train station, or go into a concert theater, etc. Once the user uses the electronic value, it is gone (deleted).

According to a platform like this, it is possible to avoid problems such as copying, losing and altering electronic values, or inconsistency (the existence of two same electronic values at transmitter and receiver.). That is, by employing a platform like the above, electronic values can be distributed safely and surely, to realize transaction of electronic values on a digital network.

FIG. 2 shows an example of the contactless IC card 12, 42, 52 that performs electronic value operations. The IC card 22 shown in FIG. 2 is a network-compatible card having an encrypting function. An IC chip 20 built into the IC card 22 includes a microprocessor 28 having a CPU 21, a ROM 27, a RAM 23 and an EEPROM 25. Received electronic value data are stored in the EEPROM 25. The IC chip further includes an RF interface circuit 24. The IC chip 20 establishes ISO 14443 contactless communication with external devices via a built-in antenna 26 which is normally a coil antenna. After the establishment of the contactless communication, received data are sent from the RF interface circuit 24 to the microprocessor 28. The microprocessor 28 processes and stores the received data. When transmitting, after the establishment of the contactless communication, an electronic value is transmitted from the microprocessor 28 via the antenna 26 to the outside. In this manner, it is realized to send and receive electronic values. It is normal to provide power to the IC chip 20 from the outside via the antenna 26.

These kinds of contactless IC cards have individual IDs. When transacting information among IC cards, first they establish contactless-communication directly with each other if they are in proximity with each other, and they establish communication utilizing another communication medium if they are away from each other. Next, they perform authentication with each other using their IDs. After authentication, they send and receive data directly with each other. When transacting electronic values between two IC cards in this manner, servers and mobile phones are merely communication media. IC cards authenticate directly with each other, and transact electronic values between memories in the IC cards. The mobile terminal device into which the IC card is inserted merely provides the communicating medium or displays or selects processing, but does not perform actual encryption, authentication or transaction of values.

By the way, the issuing server 13 functions equivalent to real world sales organizations, and sometimes has to sell a large amount of electronic values. In this case, an IC card 12 by itself does not have enough memory capacity or a high enough CPU speed to store and send a large amount of electronic values at the same time. When some user stores a large amount of electronic values and transmits them to other users, the IC card itself has similar capacity problems.

Japanese Patent Laid-Open Publications 2000-113148 and 2000-172814 disclose prior contact/contactless combination IC cards.

DISCLOSURE OF THE INVENTION

It is a general object of the present invention to provide an electronic value transferring device such as a high speed and large capacity computer or mobile terminal device that can function as a contactless IC card performing electronic value operation.

Another object of the present invention is to provide an electronic value device such as a computer or mobile terminal device that can function as a virtual high speed and large capacity IC card by being combined with a contactless IC card.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the electronic value transferring device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows:

According to one feature of the present invention, there is provided an electronic value transferring device comprising: an interface that is substantially the same as an interface for a platform for communicating directly between contactless IC cards that perform electronic value operations; and a memory for storing a large amount of electronic values.

According to another feature of the present invention, there is provided a computer comprising: an interface that is substantially the same as an interface for a platform for communicating directly between contactless IC cards that perform electronic value operations.

According to another feature of the present invention, there is provided an electronic value transferring device connectable to an IC card that performs electronic value operations, comprising: a microprocessor for transmitting and receiving data to and from the IC card; an interface circuit for providing an IC card interface to allow the IC card to send and receive electronic values to and from other IC cards by radio; an antenna; and the microprocessor having a memory for temporarily storing a plurality of electronic values.

BRIEF DESCRIPTION OF THE DRAWINGS

FIG. 4 shows a block diagram of a mobile phone terminal as an electronic value transferring device according to a second embodiment of the present invention.

BEST MODE FOR CARRYING OUT THE INVENTION

In the following, embodiments of the present invention are described with reference to the accompanying drawings.

First Embodiment

Figure 1:
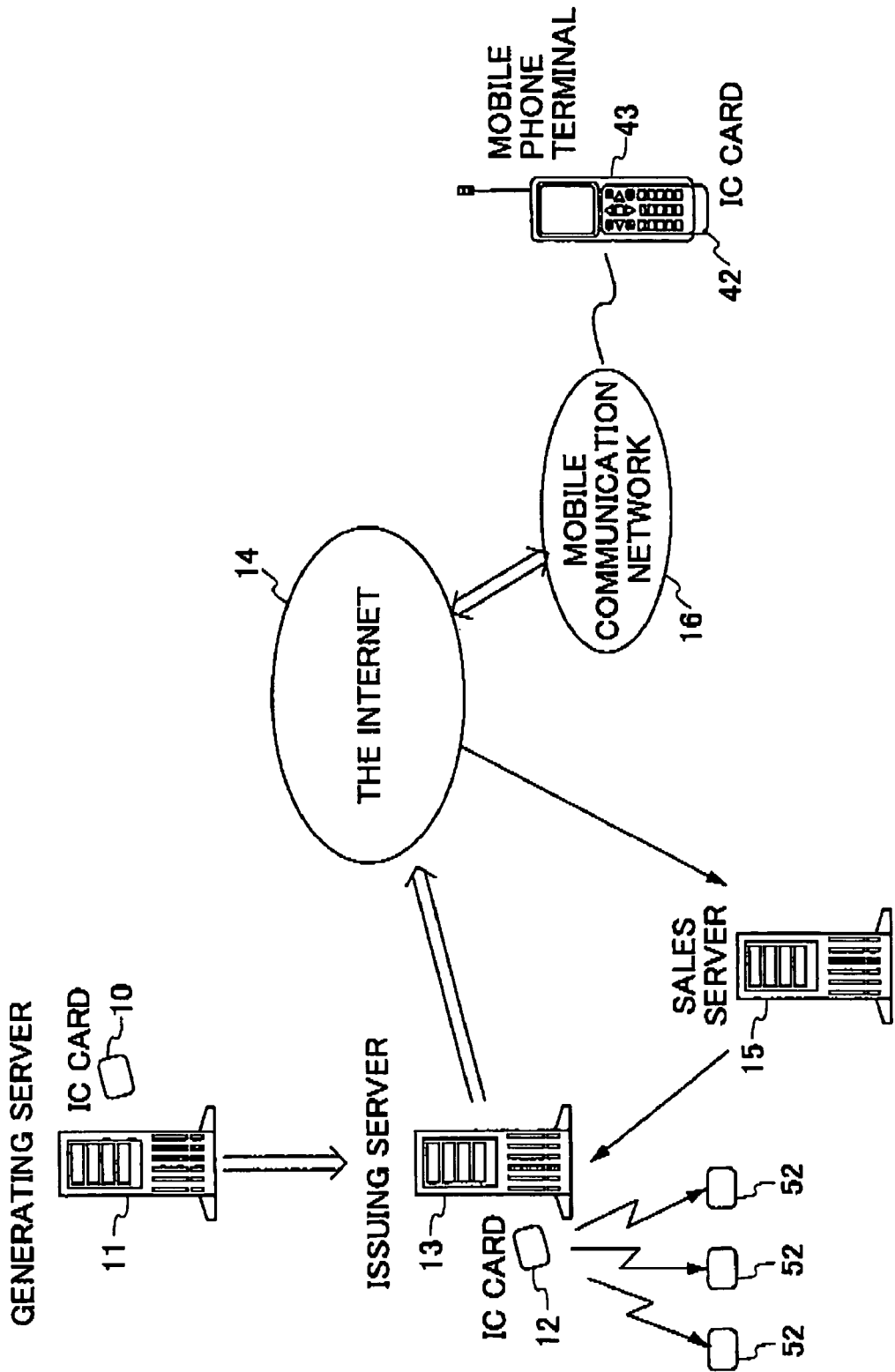
FIG. 1 generally shows a distribution platform of electronic values to which the present invention can be applied.
Figure 2:
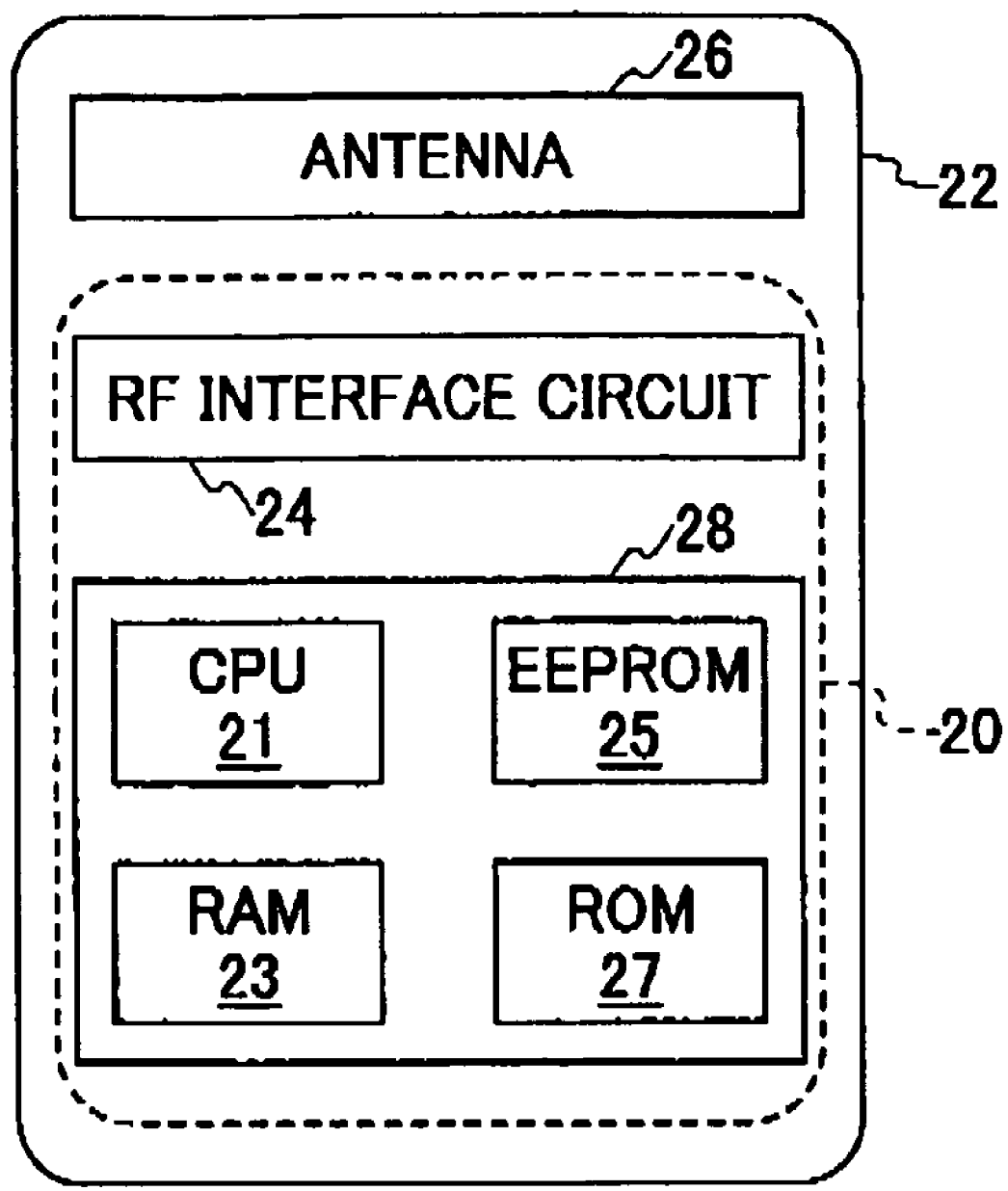
FIG. 2 shows an example of a contactless IC card that performs electronic value operations.
Figure 3:
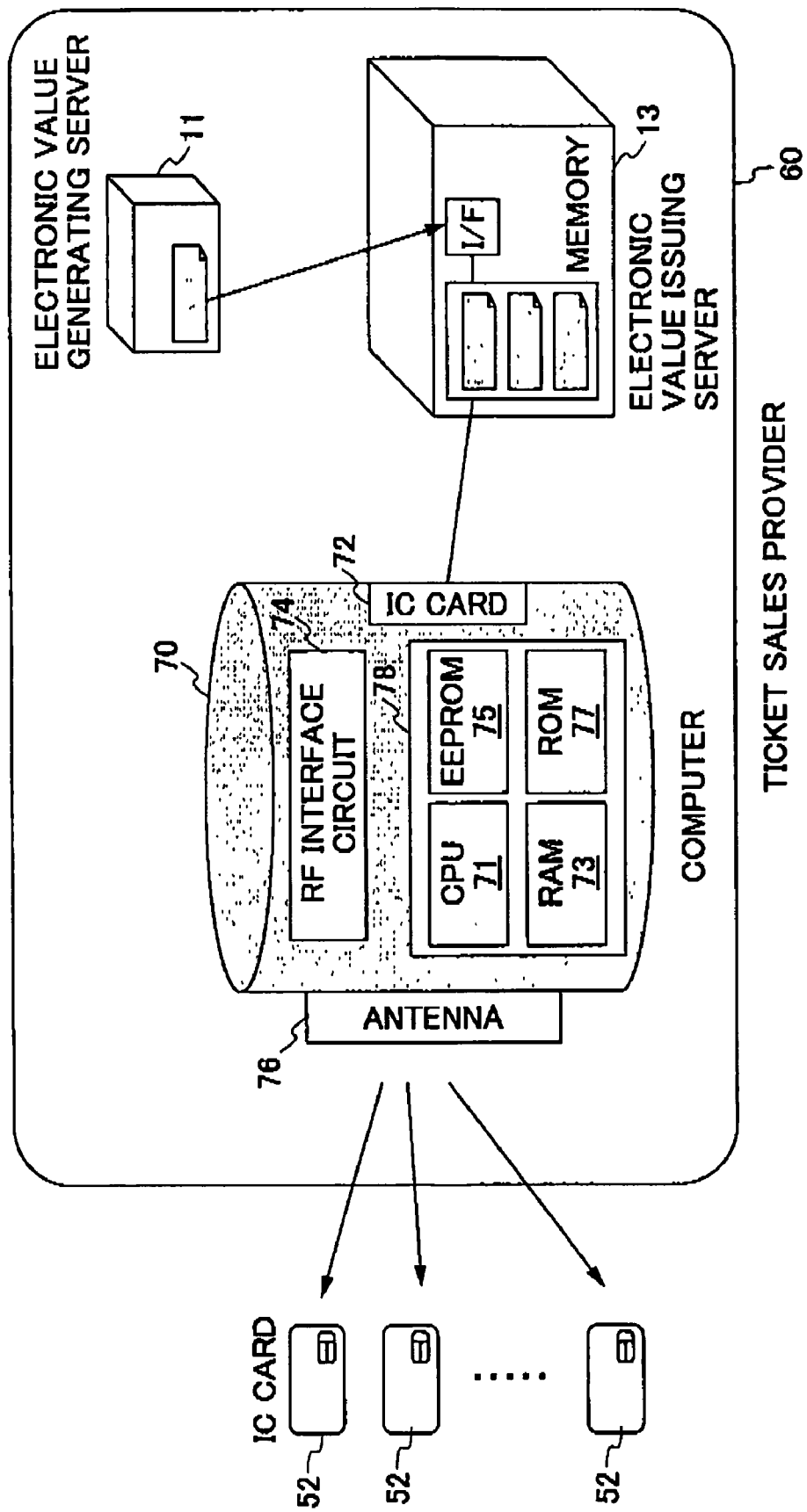
FIG. 3 shows an electronic value processing apparatus of a ticket sales provider according to a first embodiment of the present invention.

FIG. 3 shows an electronic value processing apparatus 60 of a ticket sales provider according to an embodiment of the present invention. The electronic value processing apparatus 60 comprises an electronic value issuing server 13, to which electronic values generated by an external electronic value generating server 11 are transferred. An IC card in the electronic issuing server 13 can perform security operational processing such as encryption of electronic values. When issuing and transferring with high speed a large amount of electronic values to users who bought tickets, an IC card itself does not have enough capacity to issue with high speed a large amount of electronic values. Therefore, a computer 70 is used as an electronic value transferring device, to realize high speed and large capacity processing.

The computer 70 comprises an interface that is substantially the same as an IC card interface for a communication platform among contactless IC cards processing electronic values. The computer 70 further comprises a memory for storing a large amount of electronic values. Thereby radio communication in this distribution platform can be established between an IC card 72 connected to the computer 70 and other contactless IC cards 52. The computer 70 comprises a microprocessor 78 including a CPU 71 and memories such as a ROM 77, a RAM 73 and an EEPROM 75, an RF interface circuit 74 and an antenna 76 to make sure of the radio communication between the connected IC card 72 and other contactless IC cards 52. In this manner, the computer 70 contains a large amount of electronic values, transfers them with high speed, and functions as a high speed and large capacity virtual IC card. The computer 70 can have a security operational processing part for performing encryption and others and maintain security in this distribution system.

A procedure for transferring electronic values is explained below in detail. First, a processing for issuing and storing electronic values is explained. The computer 70 as an electronic value transferring device has an interface equivalent to an IC card capable of directly communicating and has a memory. The memory includes an ID or certificate utilized in performing mutual authentication with other IC cards. When it is necessary to analyze (use) the memory in the computer 70, the IC card 72 is connected and its ID or certificate is stored in the memory in the computer 70. When storing the electronic values generated by the generating server 11, authentication is performed and communication is established between an IC card in the generating server 11 and the IC card interface in the computer 70, and then the electronic values are stored into the memory in the computer 70 through the IC card interface.

Next, processing for transferring the electronic values is explained. This time, the computer 70 communicates with a contactless IC card 52 with radio (contactless) communication. An accessing IC card 52 and the IC card interface in the computer 70 perform mutual authentication and establish communication. After the establishment, an electronic value stored in the memory in the computer 70 is sent via the IC interface to the IC card 52.

In this manner, it is possible to send/receive electronic values using a computer having higher speed and larger capacity than IC cards.

Second Embodiment

FIG. 4 shows a block diagram of a mobile phone terminal 80 as an electronic value transferring device according to a second embodiment of the present invention. The terminal is not limited to a mobile phone terminal but can be any type of mobile terminal that includes a contactless IC card interface, communicating function and large capacity of memory. To the mobile phone terminal 80, a contactless IC card 82 having a contact terminal is inserted and electrically connected. The IC card 82 can perform security operational processing such as encryption of electronic values. The mobile phone terminal 80 can make the IC card 82 communicate with an IC card in an external generating server 53, by utilizing its common function or additional structure. For example, the mobile phone terminal 80 comprises a microprocessor 88 having a CPU 81 and memories such as a ROM 87, a RAM 83, an EEPROM 85, an RF circuit 84, an interface circuit 89 having an IC card interface, and an antenna 50. Thereby, the IC card 82 can perform data communication with external devices.

For example, in a case where a problem occurs in issuing electronic values because of low capacity/low speed of the IC card in the generating server 53, a large amount of electronic values may be stored in the EEPROM 85 in the microprocessor 88 in the mobile phone terminal 80, and processed with high speed. In this manner, security operational processing such as encryption is still handled by the IC card 82, and therefore security is maintained; only the processing requiring high speed depends on the mobile phone terminal.

A procedure for transferring electronic values is explained below in detail. First, processing for issuing and storing electronic values is explained. The mobile phone terminal 80 as an electronic value transferring device has an interface equivalent to an IC card capable of directly communicating and has a memory. The memory includes an ID or certificate utilized in performing mutual authentication with other IC cards. In order to analyze (use) the memory in the mobile phone terminal 80, the IC card 82 is connected and its ID or certificate is stored in the memory in the mobile phone terminal 80. When storing the electronic values generated by the generating server 53, authentication is performed and communication is established between an IC card in the generating server 53 and the IC card interface in the mobile phone terminal 80, and then the electronic values are stored in the memory in the mobile phone terminal 80 through the IC card interface. Since there is a possibility of the memories in the mobile phone terminal 80 being analyzed (compromised), the IC card 82 in the mobile phone terminal 80 has a secret key, performs encrypting processing, and then stores the electronic value in the memory. The electronic value is safely stored in the memory by this processing.

Next, processing for transferring the electronic values is explained. This time, the mobile phone terminal 80 communicates with a contactless IC card 52 with radio phone communication. An accessing IC card 52 and the IC card interface in the mobile phone terminal 80 perform mutual authentication and establish communication. After the establishment, an electronic value stored in the memory in the mobile phone terminal 80 is sent via the IC interface to the IC card 52. An encrypted electronic value can be decrypted in the IC card 82 and returned to the memory to be transmitted.

In this manner, it is possible to send/receive electronic values using a mobile terminal having higher speed and larger capacity than IC cards.

Examples of electronic values are event tickets, commuter passes, train tickets, air tickets, electronic books, music, software, passports, driver's licenses, and so on.

As explained above, according to the embodiments of the present invention, by providing a contactless interface to electronic value transferring devices such as computers and mobile terminal devices, direct communication is possible between the electronic value transferring devices and IC cards, like direct communication between IC cards. Thereby, instead of IC cards, computers or mobile terminal devices can be used as virtual IC cards for issuing and storing a large amount of electronic values. In this manner, it is possible to issue and transfer a large amount of electronic values with high speed in an electronic value distribution platform, whose speed and capacity are several dozen times of those of normal IC cards.

Further, the present invention is not limited to these embodiments, but variations and modifications may be made without departing from the scope of the present invention.

The invention claimed is:

1. An electronic value transferring device connectable to an IC card that performs an electronic value operation, comprising:
   a microprocessor for wired transmitting and receiving data to and from the IC card;
   an interface circuit for providing an IC card interface to allow the IC card to receive an electronic value from an external server by radio;
   an antenna; and
   the microprocessor having a memory for temporarily storing a plurality of the electronic values and transferring the stored electronic values to another external IC card.

2. The electronic value transferring device as claimed in claim 1, wherein the electronic value transferring device is a mobile station of a cellular phone system.

3. The electronic value transferring device as claimed in claim 1, wherein the electronic value transferring device is a computer.

4. The electronic value transferring device as claimed in claim 1, wherein the connectable IC card is a contactless IC card.

5. An electronic value transferring device connectable to an IC card that performs an electronic value operation, comprising:
   a microprocessor configured to perform wired to transmission and reception of data to and from the IC card;
   an interface circuit configured to provide an IC card interface to allow the IC card to receive an electronic value from an external server by radio; and
   an antenna,
   wherein the microprocessor includes a memory configured to temporarily store a plurality of the electronic values and to transfer the stored electronic values to another external IC card.

6. The electronic value transferring device as claimed in claim 5, wherein the electronic value transferring device is a mobile station of a cellular phone system.

7. The electronic value transferring device as claimed in claim 5, wherein the electronic value transferring device is a computer.

8. The electronic value transferring device as claimed in claim 5, wherein the connectable IC card is a contactless IC card.

* * * * *